United States Patent [19]

Jaklin

[11] Patent Number: 4,869,752
[45] Date of Patent: * Sep. 26, 1989

[54] METHOD FOR PREVENTING THE CORROSION OF STEEL STRUCTURES OR STEEL REINFORCEMENTS OF BUILDINGS

[76] Inventor: Hans Jaklin, Erlenhof, Aacherweg 15, D-5500 Trier, Fed. Rep. of Germany

[*] Notice: The portion of the term of this patent subsequent to Sep. 19, 2006 has been disclaimed.

[21] Appl. No.: 130,694

[22] Filed: Dec. 9, 1987

[51] Int. Cl.$^4$ .............................................. C04B 12/04
[52] U.S. Cl. .................................. 106/14.21; 106/74; 106/76; 52/514
[58] Field of Search ..................... 126/140.5, 14.21, 74, 126/76; 422/7; 428/378; 52/514

[56] References Cited

U.S. PATENT DOCUMENTS

| | | | |
|---|---|---|---|
| 1,129,320 | 7/1915 | Vail et al. | 106/74 |
| 2,879,578 | 3/1959 | Ulfstadt | 106/14.21 |
| 2,944,919 | 7/1960 | Morris et al. | 106/14.21 |
| 3,180,746 | 4/1965 | Patton et al. | 106/74 |

Primary Examiner—William R. Dixon, Jr.
Assistant Examiner—David M. Brunsmann
Attorney, Agent, or Firm—Sprung Horn Kramer & Woods

[57] ABSTRACT

To prevent the corrosion of steel structures or steel reinforcements of buildings the finished steel structure or the embedded reinforcement is treated with the solution of a modified alkali silicate having a $Me_2O:SiO$ ratio of 1:2 to 1:3.

1 Claim, No Drawings

METHOD FOR PREVENTING THE CORROSION OF STEEL STRUCTURES OR STEEL REINFORCEMENTS OF BUILDINGS

In structures made of reinforced concrete the concrete has two functions to fulfill. It has to absorb compressive strains and it has to protect the steel against corrosion. The reinforced steel serves the function of absorbing the shear and tensile stress.

The protective effect of the hardened cement paste for the iron and its duration are dependent on several factors. On the one hand there are the climatic and environmental conditions and on the other hand there is the quality of the concrete which is primarily determined by the amounts of cement, the grain of the concrete aggregate, the water cement factor and the concrete compression.

The protective effect of the concrete for the iron is dependent on the high alkalinity of the $Ca(OH)_2$ produced during hydroylsis—pH around 13. The carbonic acid formed by the carbon dioxide in the air together with water reacts with the calcium ions of the calcium silicate hydrate or calcium aluminate hydrate phases of the hardened cement paste forming calcium carbonate. The concrete carbonates, as this process is generally called, at a concrete dampness, which arises at a relative humidity of under around 60%. If the concrete pores are practically completely filled with water, the carbonation comes to a halt. How quickly and how deep the carbonation penetrates the concrete depends on the dampness of the concrete and its structure. In the case of complete carbonation the pH value of the concrete drops to around 8. The corrosion of the iron still does not need to set in if as in the inner spaces the concrete is dry. Concrete dampness which come about at relative humidities of between 80 and 100%, lead to the formation of rust on the reinforced iron, as soon as the pH value of the surrounding institial fluid drops below 9.5. The corrosion is increased substantially by salts (thawing salts) which penetrate together with the water. In particular the chloride ions lead to the feared holes being eaten into the iron, which then reduces the supporting capacity of the structure. But also the overall surface corrosion of the iron, which only leads to an insignificant loss in strength of the building structure in the beginning, can already cause large follow-up damage. The take up of oxygen and hydration water increases the weight of the corrosion product, $Fe_2O_3 \times H_2O$, referring to the amount of corroded iron to the amount of absorbed hydration water. Depending upon the amount of the absorbed hydration water and the embedded salts the corrosion products of the steel can take on four to eight times the original volume. As a result of the increase in volume first of all the surface layers split away. Later cracks form throughout the entire building.

The same applies for steel constructions veneered with synthetic chalky sandstone, concrete stones, natural stone or bricks. An additional damage promoting factor is the formation of cracks in the bonding of stone and the joint-filling mortar which is caused by the varying behavior of these materials under temperature fluctuation. Whereas in the case of reinforced concrete following appropriate construction mainly only the surface and the layers near the surface exhibit cracks, for this type of structure the cracks run throughout the entire width of the wall right on through to the support construction. The rain water, which always contains oxygen dissolved in its, can penetrate to the iron practically without any problem. The salts also have a corrosion promoting effect. They are transported dissolved in the rain water on their way from the outer layer through the mortar and the cracks in the stone.

There has been no lack of tests to provide the steel parts for the structure or the reinforcement with anticorrosive protection at the latest before attaching the veneer material or pouring the unset concrete. This takes place inter alia with inorganic salts, in particular nitrites and chromates, which oxidize the surface of the steel material and form a dense metal oxide protective coating.

Cathodic corrosion inhibitors from the group of carbonates, phosphates and polyphosphates form together with other ions present under corrosive conditions a protective coating of low water soluble salts on the surface of the steel material and thereby inhibit the corrosion (DE-OS No. 35 13 566).

Anticorrosion coatings in general, i.e. not considering any strong bonding between the steel structure or reinforcement and the surrounding silicate material contain mainly pigments such as lead oxide red, lead, silicochromate, zinc dust, lead powder and various phosphates and phosphites. These anti-rust systems are generally recognized as safe with respect to work hygiene (K.-D. Ledwoch, "Metalloberfläche 40", (1986), P. 57–59). They cannot produce a strong bonding between iron and the concrete or mortar either, since the steel coated by these systems is not wetted sufficiently with the mortar or the unset concrete.

Further an anticorrosion process is known for the steel reinforcement in concrete, in which during the pouring of the unset concrete adipic or abietic acid is added as sealing agent in an amount of 1.5% based on the percent of cement, and the steel inserts are then protected anodically by the feeding of electricity (C.A. 104:134017k).

The invention is based on the problem of preventing the corrosion of steel structures or steel reinforcements or the problem of substantially improving the corrosion resistance. According to the invention this takes place by treating the finished steel structure or the embedded reinforcement with the solution of a modified alkali silicate with a $Me_2O:SiO_2$ ratio of 1:2 to 1:3. Preferably the alkali silicate solution contains metastably dissolved or in suspension silicic acid with a $Me_2O:SiO_2$ weight ratio of 1:3 to 1:12.

In the above general formulas $Me_2O$ for the alkali oxide part Me means an alkali metal such as lithium, sodium or potassium, preferably a mixture of potassium and sodium. A percent by volume of the alkali silicate is usually diluted with 0.5 to 3% by volume water. That corresponds to a $SiO_2$ concentration in the solution of around 7 to 20 percent.

The silicic acid xerogel suitably has a surface according to BET of 25 to 800 $m^2/g$, in particular 100 to 600 $m^2/g$. A hydrogel added as in the invention suitably contains 33 to 66% $SiO_2$ and the surface according to BET lies between 250 and 800 $m^2/g$. Both the xerogel and the hydrogel are suitably ground so fine, that 98 to 99% of the particles are smaller than 40 um. The silicic acid hydrosol used in the invention to increase the $Me_2O:SiO_2$ ratio to 1:2 to 1:12, preferably 1:3 to 1:10, suitably has a BET surface up to 200 $m^2/g$ and a pH value above 8. The finished suspension has a pH value of 10, preferably 11.0 to 12.1.

The BET method used above and hereinbelow for determining the surface by calculating the monolayer capacity is from Brunauer, Emmet and Teller and is described inter alia in "Ullmanns' Enzylkopädie der technischen Chemie, Band II/1", P. 758/759.

In a preferred embodiment of the invention the embedded steel structure or steel reinforcement treated with the modified alkali silicate is sheathed or encapsuled with mortar or unset concrete containing 2 to 6% by weight, based on the amount of cement, of a finely composed amorphous silicic acid having at least 90% by weight $SiO_2$ or finely composed active precipitated silicates of magnesium, calcium, barium or aluminum. These silicic acids or silicates have a BET surface of between 50 to 200 $m^2/g$ and according to the grain analysis by Cilas a $d_{50}\%$ value below 20 μm. For the grain analysis an apparatus made by Cilas company is used. It functions according to the laser beam method. This method is described by J. Swithenbank et al. in "Experimental diagnostics in gas phase combustion systems, Progress in Astronautics and Aeronatutics, Vol. 53, (1977)".

Preferred as the finely composed silicates added to the mortar are barium silicate with a composition of 40% BaO, 52% $SiO_2$ and 8% annealing loss or a sodium aluminum silicate with a composition of 73% $SiO_2$, 7% $Al_2O_3$, 7% $Na_2O$ and 12% annealing loss.

The inhibition of the corrosion of steel by the modified alkali silicates of the invention is illustrated by the following examples.

The corrosion tests were carried out under precisely defined and controllable conditions over a longer period of time, whereby the steel specimens treated with the modified alkali silicate solution were compared with the non-treated specimens.

EXAMPLE 1

Description of the test

The tests were carried out using round rods of constructional steel with a length of around 15 cm and a diameter of 11 mm of the following analysis: C 0.17%, Mn 0.70%, Si 0.30%. The rest is almost exclusively iron up to possibly a maximum of 0.03% S and 0.03% P.

In order to be able to take into consideration the surface state the following specimen samples were taken: (a to c with and without a coating of alkali silicate prior to the encasement in cement)

(a) common mill scale (b) common mill scale, however after having allowed rust to start to build up by exposing it to outdoor weather conditions (c) sand blasted in order to compare the above specimens with clean steel (d) without the coating of alkali silicate however sheathed in cement Using commercial Portland cement of the following analysis ($SiO_2$ 21%, CaO 64%, MgO 1.2%, $R_2O$ 9%) a sludge was produced with which the round rods pretreated with alkali silicate are coated by short immersion therein. A concentric cement layer resulted having a wall thickness of around 1 mm. Both common as well as cement mixed with 5% NaCl were used for the encasement.

The steel rods were coated prior to the cement coating with the alkali silicate solution by short immersion and initial drying at room temperature. The alkali silicate solution used had the following composition:

| | |
|---|---|
| $SiO_2$ | 19.14% |
| $Na_2O$ | 7.54% |
| $CrO_4^{-2}$ | 0.31% |
| $CO_2$ | 0.7% |
| Ethanol | 0.92% |

The rest to 100% consisted of water

| | |
|---|---|
| Weight ratio | $SiO_2:Na_2O$ = 2.54:1 |
| Density | 1.251 |
| Viscosity | 10.1 cP |
| Surface tension | 54 dyn/cm |
| pH value | 11.4 |

In this way real conditions were able to be easily simulated. If such a specimen is exposed to weather conditions then cracks occur in the cement due to the differential thermal expansions through which water penetrates down to the steel and—in case there are no inhibitors present—together with the omnipresent oxygen may form rust, causing the cement layer to split away and the damage to become larger.

Since it was known from long years of experience that the appearance of corrosion is able to be accelerated by an ambient temperature increased to 40° C., without any qualitative changes in the course of the reaction, the encased and pretreated specimens were placed in a humidity chamber with 100% humidity (condensation) and exposed to a temperature of 40° C. for 10 months. Periodically the temperature was lowered for a short time, in order to enable the previously mentioned differential expansion which leads to the formation of cracks.

Together with the pretreated specimens the nonpretreated sheathed specimens were tested in order to enable a clear comparison.

After 10 months the cement sheathing was knocked away from the specimen rods, laying bare the metal surface.

The specimens from which the cement was removed were examined visually and compared to one another.

The purely visual comparison had the result that in any case the non-pretreated control specimen had started to rust incomparably more that the rods pretreated with the alkali silicate. As for the coated sand blasted specimens the original bright metal color was largely maintained over after 10 months' storage in the climate chamber.

Further it was noted that the adhesion of the cement to the steel rods treated with the alkali silicate solution was better than on the untreated specimen.

The strongly adhesive normal cement on the coated specimens was difficult and not completely removable without scraping off some of the metal.

It should be stressed that this inhibition can only be attributed to the coating with the above identified alkali silicate solution, since the carbonation after 10 months storage had penetrated a wall thickness of 1 mm and the passivation due to the cement alkalinity therefore could no longer be effective.

EXAMPLE 2

Concrete cubes, 20×20 cm, containing iron reiforcements were produced. The basic state of the reinforcing steel was identical to (b) of the laboratory sample—common mill scale following initial rusting after storage outdoors. The coating prior to its being encased in concrete tool place in the same manner as for the corresponding lab samples.

The pretreated steel was embedded in the concrete mixtures A and B.

| Composition of the concrete mixtures | | |
|---|---|---|
| | A Amounts in kg | B |
| Cement | 307 | like A |
| Water | 156 | like A |
| Aggregate, 12 mm | 1045 | like A |
| Aggregate, 5 mm | 418 | like A |
| Sand | 627 | like A |
| NaCl | 29 | like A |
| Silicic acid acc. to Claim 3 | 9.22 kg = 3% based on cement | without addition of active silicic acid |
| commercial plasticizer | 1.7 liter | 1.7 liter |

Results

As in the case of the lab specimens the result was a very good adhesion of the concrete to the iron as well as a distinctive inhibition. The beginning of rust formation was minimal despite the storage of the specimens in or at the Persian Gulf.

EXAMPLE 3

QUANTITATIVE SHORT-TERM TESTS

In order to quantitatively measure the influence of the silicate inhibitors on the formation of rust, both pretreated and non-pretreated specimens were place din distilled water and in well aerated water containing 5% NaCl for 30 days at room temperature. In this case the specimens were not encased in cement.

On the specimens pretreated with silicate inhibitors a very dark, almost black coating developed, whereas on the control sample common red dust occurred.

The weight losses varied from specimen to specimen, the mean values however showed clearly a higher weight loss due to rust for the non-pretreated specimens.

The identification of the rust layer components and of the inhibiting protective layers took place by Mossbauer spectroscopy.

The Mossbauer spectroscopy permits a very good identification of oxides of the iron. It was therefore employed to provide a detailed clarification of the composition of the reinforced steel surfaces treated with sodium silicate inhibitors.

The steel specimens from the Arabian Gulf (2) described in Examples 1 and 2 and the rods from the short-term tests (3) were studied.

The evaluation of the results of the Mossbauer spectroscopy shows that the iron oxide layers consist partly of magnetite and partly of goethite.

It is surprising that the modified alkali silicates are capable of forming this corrosion inhibiting protection of strongly adhesive magnetite and goethite also on rusty steel ($Fe_2O_3 \cdot XH_2O$) at room temperature. Consequently the continued penetration of the corrosion is greatly inhibited.

Both the long-term tests in the lab over 10 months and the exposure to outdoor ocean weather conditions over 1 year of reinforced steels sheathed in cement proved that in the case of a pretreament of the steel with the modified alkali silicates the corrosion is remarkably inhibited, namely due to the formation of a corrosion inhibiting magnetite and goethite layer, whereby the durability of the steel-concrete bonding can be substantially lengthened.

It will be understood that the specification and examples are illustrative but not limitative of the present invention and that other embodiments within the spirit and scope of the invention will suggest themselves to those skilled in the art.

What is claimed is:

1. A method for preventing the corrosion of steel structures or steel reinforcements of buildings comprising treating the finished steel structure of the embedded reinforcement with an alkali metal silicate solution which contains metastably dissolved or in suspension silicic acid up to an alkali metal oxide: $SiO_2$ weight ratio of 1:2 to 1:12 and then coating it with a mortar containing 2 to 6% by weight, based on the amount of cement, of a finely composed member selected from the group consisting of amorphous silicic acid with at least 90% by weight $SiO_2$, and active precipitated magnesium silicate, calcium silicate, barium and aluminum silicate with a BET surface of 50 to 200 $m^2/g$ and a $d_{50}\%$ value below 20 $\mu m$.

* * * * *